United States Patent [19]

Hoch

[11] 4,029,356

[45] June 14, 1977

[54] TRUCK BODY CLOSURE

[75] Inventor: Norris R. Hoch, Largo, Fla.

[73] Assignee: Jeff-Ko Manufacturing Co., Inc., Milwaukee, Wis.

[22] Filed: Oct. 16, 1975

[21] Appl. No.: 622,885

Related U.S. Application Data

[62] Division of Ser. No. 454,728, March 25, 1974, Pat. No. 3,913,969.

[52] U.S. Cl. .......................................... 296/137 B
[51] Int. Cl.² ........................................ B60P 7/02
[58] Field of Search ................ 296/137 B; 91/449; 298/22 C

[56] References Cited

UNITED STATES PATENTS

| | | | |
|---|---|---|---|
| 2,551,239 | 5/1951 | Bond | 296/137 B |
| 3,683,748 | 8/1972 | Mahl | 91/449 |
| 3,700,396 | 10/1972 | Adams | 91/449 |
| 3,833,255 | 9/1974 | Logue | 296/137 B |

Primary Examiner—Robert R. Song
Attorney, Agent, or Firm—John M. Diehl

[57] ABSTRACT

Closure for open top truck box body is a single rigid member which opens hingeably on a transverse axis near the upper front edge of the box body and has skirt portions which extend downwardly along sides of the box body in the closed position. Hydraulic cylinders open the closure and pressure of fluid supplied to the cylinders is limited to a pre-selected value so that the cylinders can only raise the closure itself and cannot raise it if it carries an additional load. Thus it cannot be operated to serve as a crane or hoist and cannot be raised if a person is standing on it.

1 Claim, 3 Drawing Figures

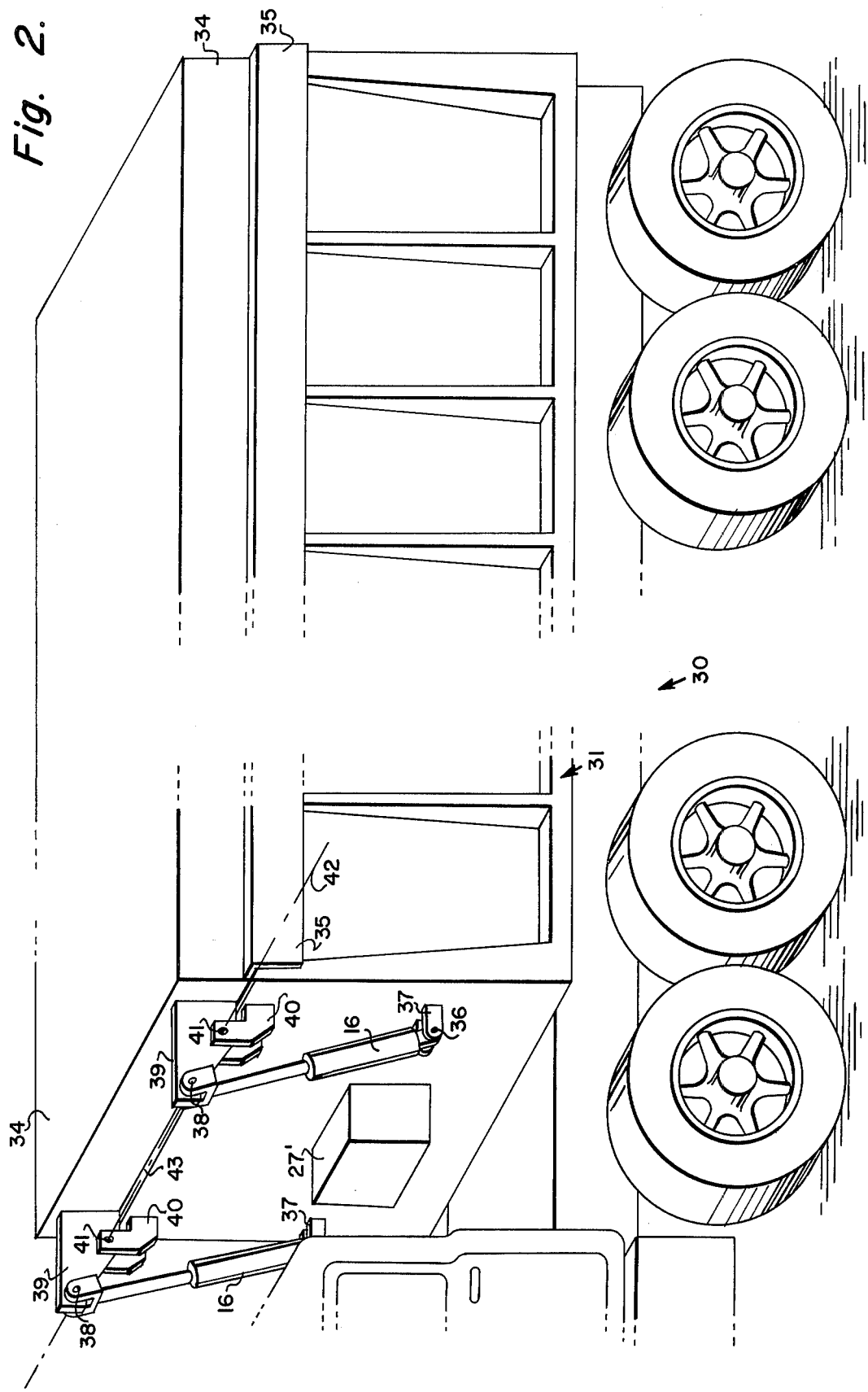

TRUCK BODY CLOSURE

This is a division of application Ser. No. 454,728, filed Mar. 25, 1974, now U.S. Pat. No. 3,913,969.

FIELD

This invention relates to a top closure for a truck body box which is open at the top and more particularly to such a closure which comprises a single member of substantially rigid construction and which is hinged to the box at the front on a transverse axis and which is opened hydraulically.

PRIOR ART

The following patents show closures for dump truck and other bodies which have heretofore been proposed; they involve flexible or sectional covers:

U.S. Pat. Nos. 3,342,523; 3,368,500; 3,416,834; 3,416,835; 3,498,666; 3,511,408; 3,515,428; 3,549,198; 3,549,197; 3,675,967.

Other patents of possible interest include: U.S. Pat. Nos. 3,656,802; 3,549,199; 3,488,087; 3,319,994; 3,009,426; 3,008,759; 2,997,967; 2,979,361; 2,899,912.

Each of the following patents shows a closure member for a pick-up truck body which is not opened by hydraulic or other power means: U.S. Pat. Nos. 3,762,762; 3,051,523; 3,012,814; 2,989,340; 2,912,276.

The device described herein represents an improvement upon the devices disclosed in the above-listed patents. It differs in structural and operational features described hereinafter.

SUMMARY

Open dump trucks have been used for carrying a large variety of materials including sand, gravel, rock, refuse and debris and the like. Open-topped box body farm trucks are often used for carrying small grains such as wheat and shelled corn. Open-topped semi-trailers are often used for carrying small grains such as wheat and corn and they are also used for carrying fine material such as sand and fertilizer. Many fine materials carried in such box bodies tend to be blown from the body or removed from the body by air currents resulting from ambient winds, air flow due to speed of the vehicle or a combination of both. In some instances such loss of material is objectionable to the trucker or shipper. This is the case if small grain or fertilizer is lost in this manner. If dirt, refuse or fine dust, however, is lost in this manner, generally those who then object most are other motorists and owners of property adjoining roads on which the trucks operate.

Thus, for various reasons closure means to prevent loss of material from open-topped truck bodies are desirable.

Accordingly, means have heretofore been proposed for providing closures for such truck bodies. Generally such closures have involved flexible covers or sectional covers and generally opening and closing such covers has been accomplished manually.

For small trucks such as pickups it has been proposed to provide a single substantially rigid closure member generally counterbalanced with hinge and spring members located inside the body for easy manual operation. Covers such as have been proposed for such pickups are wholly impractical for dump trucks or semi-trailers. Flexible covers or covers involving flexible portions generally have been found to deteriorate relatively rapidly. Sectional covers are relatively inherently complex and accordingly relatively expensive and have not been widely adopted.

In accordance with the present invention a single substantially rigid closure member is provided for open-top box bodies of large vehicles such as dump trucks and semi-trailers. Operation of the closure is accomplished with hydraulic cylinders disposed exterior to the closure and to the box body and the closure is hinged on a transverse axis disposed forwardly and upwardly of the upper front edge of the box portion of the body.

Conventional hydraulic components including a pump and a reservoir are provided to supply hydraulic fluid to the cylinders at a suitable pressure. In accordance with the invention, however, regulating or restricting means are provided to make possible the operation of setting the pressure at a preselected value such that the closure member cannot be raised if a person is standing on top of it or if a portion of the load inside the box body has become entangled with or hooked onto any portion of the closure member. In this way also operation of the closure member as a hoist or crane is avoided since such operation might damage the closure member since it may be optimally designed not to serve as the boom of the hoist or crane but only to act as a closure and support its own weight.

OBJECTS

It is therefore an object of the invention to provide an improved closure member for an open-topped box body of a wheeled vehicle such as a dump truck or semi-trailer.

Another object is such a closure provided with supplementary means to prevent escape of or loss of the contents of the box body therefrom.

Another object is method and means to prevent operation of the closure member as a crane or hoist.

Another object is method and means to prevent, as a safety measure, operation of the closure when a person is standing on top thereof.

Further objects will become apparent from the following detailed description and the drawings:

DRAWINGS

In the figures like part numbers refer to like parts and:

FIG. 2 is a perspective view of another embodiment; and

DESCRIPTION

Figure 1:
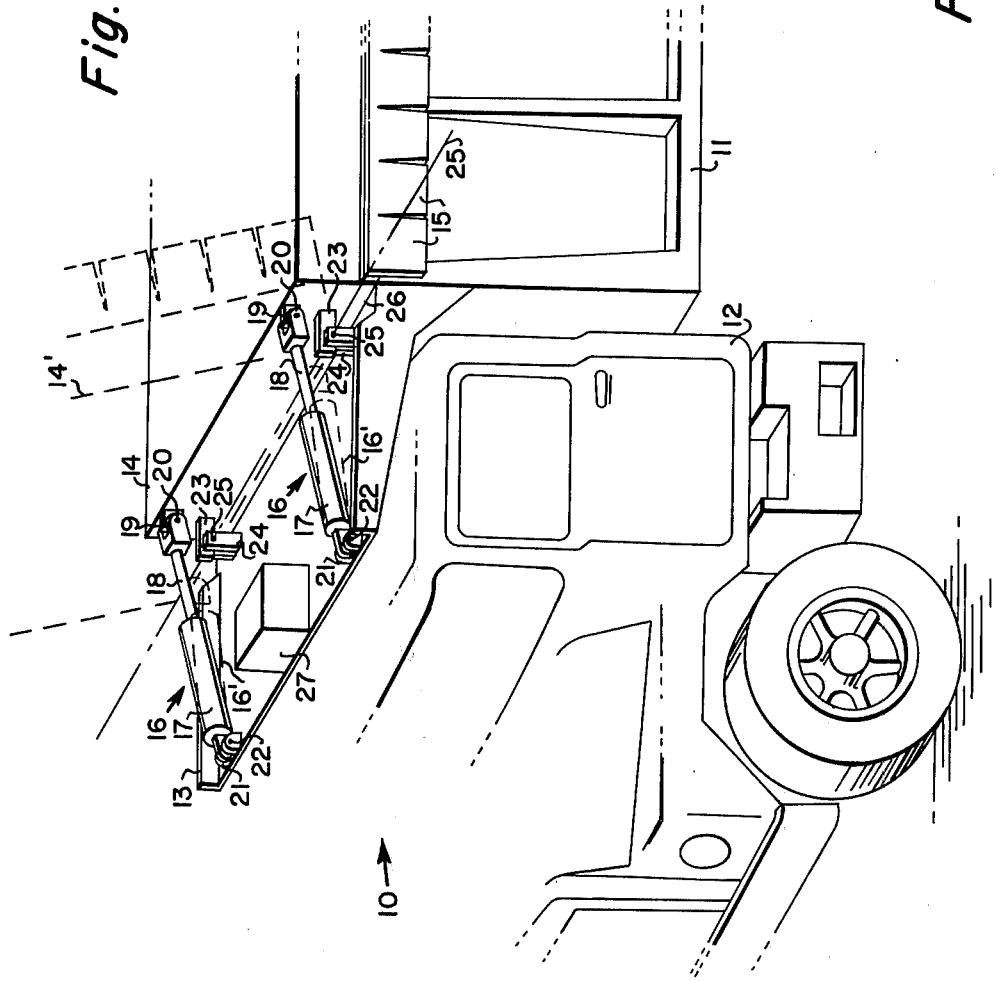
FIG. 1 is a perspective view of one embodiment.

Referring now to FIG. 1 there is shown a dump truck indicated generally as 10 comprising an open-topped box body indicated generally as 11 which comprises a portion 13 extending over a cab 12 of the truck to protect the cab from falling articles and material. Such articles or material are generally a portion of the load being dumped into the truck body from a crane or shovel and most if not all large dump trucks are provided with a portion corresponding to portion 13 to protect the cab and its occupant or occupants from falling portions of the load which miss the box body and would otherwise damage or even in some instances crush the cab. Closure member 14 is a single substantially rigid structure of substantially rigid material such as steel and is disposed to overlie and cover the open top of the box body. Closure 14 is preferably provided at its sides and rear with depending skirt portions 15 which extend downwardly as shown along and adjacent to upper portions of the sides of the box body and the rear of the box body 11. To open closure member 14, hydraulic operating members 16 may be provided, eac of which comprises a cylinder 17 and a piston (not shown) contained within cylinder 17 and connected to piston rod 18.

Means 19 are provided near the upper front edge of closure 14 for attaching hydraulic operating members 16 to closure 14 with pins 20.

Means are provided near the forwardmost portion of projecting portion 13 for attaching hydraulic operating members 16 to box body 11 with pins 22.

Members 23 are attached to closure 14 and extend forwardly therefrom and members 24 are attached to box body 11 or a portion thereof such as a portion of portion 13 and extend upwardly therefrom and members 23 and 24 are hingeably attached with pins 25 to provide for hingeable movement of closure 14 with respect to box body 11 on axis 25 which extends transversely with respect to the vehicle and is located substantially forwardly of upper front top edge 26 of the box body and at an elevation above that of edge 26.

Means such as described below in connection with FIG. 3 to supply hydraulic fluid to hydraulic operating members 16 may be enclosed within the enclosure 27 attached to portion 13.

The position of closure 14 when it is opened or raised to the maximum extent possible, and the corresponding positions of hydraulic operating members 16, are shown in dashed lines respectively at 14' and 16'.

In another embodiment the invention is applied to a semi-trailer as shown in FIG. 2 wherein semi-trailer indicated generally as 30 may be attached to a tractor.

semi-trailer 30 is provided with an open-top box body 31 and in accordance with the invention closure 34 is provided for box body 31. Closure 34 may be provided with depending skirt portions 35 which may extend downward, outside the upper portions of the sides of box body 31 and the rear of box body 31. Skirt portions 35 may be rigid as shown in FIG. 2 or flexible as shown for skirt portions 15 in FIG. 1.

Hydraulic operating members 16 may be identical with those of FIG. 1 as shown or may be larger or smaller. Each of members 16 may be attached at one end with pins 36 to brackets 37 extending from body 31. The other ends of members 16 may be attached with pins 38 to brackets 39 extending from closure 34.

Brackets 39 may be attached to brackets 40 extending from body 31 with pins 41 disposed on axis 42. Axis 42 extends transversely with respect to the vehicle, that is, semi-trailer 30, and is preferably disposed as shown, forwardly of the upper front edge 43 of box body 31 and at an elevation higher than that of said edge 43.

Figure 3:
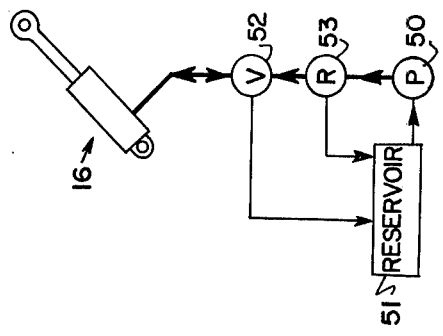
FIG. 3 is a schematic view of a hydraulic system showing the method of operation of the embodiments of FIGS. 1 and 2.

The apparatus shown schematically in FIG. 3 may be contained within enclosure 27' attached to body 31.

Referring now to FIG. 3 there is shown schematically apparatus for supplying hydraulic fluid under pressure to hydraulic operating members 16 of FIGS. 1 and 2 which may comprise, as shown, pump 50, reservoir 51, valve 52 and a regulator or restrictor 53 which is manually adjustable or settable. In accordance with the invention, as a critical step in the operation of the device, regulator or restrictor 53 is adjusted or set so that the pressure supplied through valve 52 to member 16 is sufficiently great to open or raise closure 14 or closure 34 but is insufficient to raise either closure 14 or 34 when a person is standing on top thereof to prevent as a safety measure injury to such a person who might be caused to fall from 15 to 30 feet or more if the closure were raised under these circumstances. Likewise, damage to the closure is prevented which might be caused if the closure were opened at a time when a portion of the load within the box body is entangled with or otherwise temporarily accidentally attached to the closure.

The closure would be likely to be damaged if it were used as a crane or a hoist unless it was specifically designed to be sufficiently strong and heavy for this purpose. Usually the closures are made only strong enough to serve their function as closures. Use of the apparatus for such purposes which might damage the closure may be prevented by providing restrictor 53 and carrying out the step of setting the restrictor 53 in the manner hereinbefore described.

It will be apparent to those skilled in the art that equivalents may be utilized.

Accordingly, the present invention may be embodied in other specific forms without departing from the spirit or essential attributes thereof, and, accordingly, reference should be made to the appended claims, rather than to the foregoing specification, as indicating the scope of the invention.

It is claimed:

1. In a method of opening a closure which extends laterally when closed and upwardly when open and in which hydraulic fluid under pressure is supplied to hydraulic means to open the closure, the step of adjusting said pressure to a value such that the pressure is insufficient to open said closure if the weight of a human being is provided as a substantial downward force extraneous to the weight of the closure as a safety measure to prevent damage to said human being.

* * * * *